Nov. 9, 1971     R. R. GOINS     3,618,447
DETERIORATION FASTENERS
Filed Sept. 15, 1969

INVENTOR.
R. R. GOINS

BY

*Young & Quigg*

ATTORNEYS

United States Patent Office 3,618,447
Patented Nov. 9, 1971

3,618,447
DETERIORATION FASTENERS
Robert R. Goins, Bartlesville, Okla., assignor to
Phillips Petroleum Company
Filed Sept. 15, 1969, Ser. No. 857,681
Int. Cl. F16b 15/00, 15/06
U.S. Cl. 85—49         2 Claims

ABSTRACT OF THE DISCLOSURE

Fastening apparatus are disclosed which embody one or more legs having upwardly and outwardly projecting barbs which provide resistance to withdrawal after insertion in the material to be fastened. By fabricating the fasteners from polymeric materials which undergo decomposition in ultraviolet light, the fasteners have a predictable life.

---

This invention relates to fasteners.

In one of its more specific aspects, this invention relates to fastening apparatus which resists withdrawal.

The use of staples and similar pressure-installed fasteners is widespread. Generally, installations made with such materials are reasonably durable and remain effective for extended periods of time. While seemingly this latter factor would be of value in the use of fasteners, there are instances in which disintegration of the fastener after a reasonable period of time would be desirable. The apparatus of this invention provides such a fastener.

According to the apparatus of this invention there is provided a fastener having at least one shank portion, said shank portion being adapted for insertion into the material to be fastened, said shank portion being adapted with barbs protruding upwardly and outwardly therefrom and positioned to resist withdrawal of the shank from the material into which the shank is inserted.

In one embodiment of this invention, the fastener is adapted with a single shank member.

In another example of this invention, the fastener is adapted with a plurality of shank members.

In still another embodiment of this invention, the fastener is adapted with a plurality of shank members and the members interconnecting said shank members are adapted to impart a bearing force upon the material fastened.

Accordingly, it is an object of this invention to provide a fastener of unusual staying power.

It is another object of this invention to provide a fastener which has a reasonably predictable life.

The apparatus of this invention is particularly suitable for use in fastening or retaining seeding mats in position, the fasteners resisting removal from their fastening positions while undergoing progressive disintegration or deterioration, the completion of their deterioration being timed to coincide with development of the seed mats so as not to act as obstacles after the presence of a fastener is no longer required.

Figure 1:
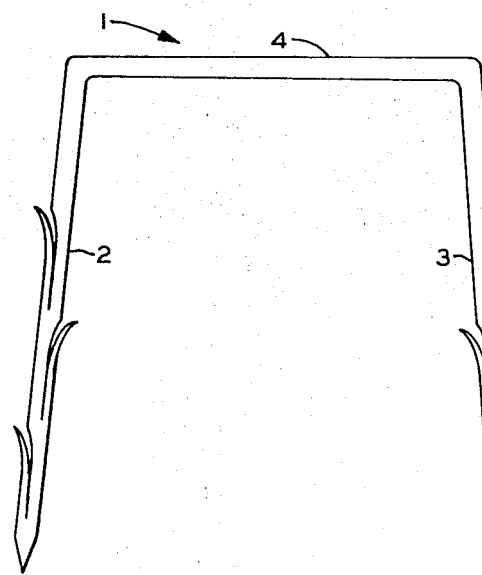
Figure 2:
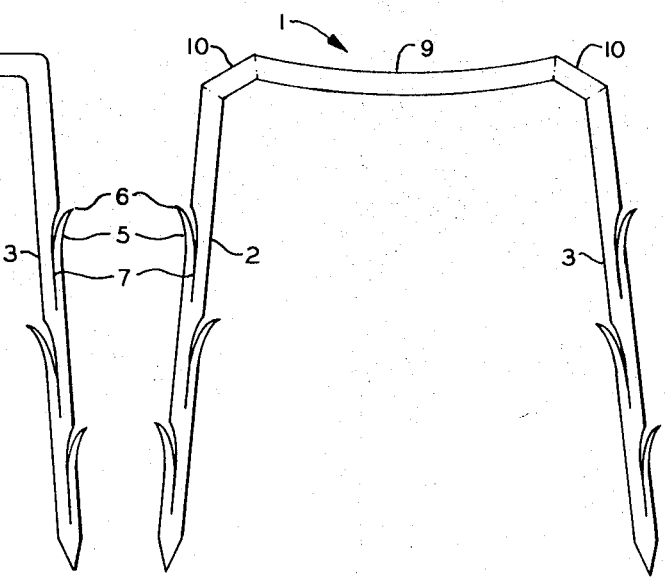
Figure 3:
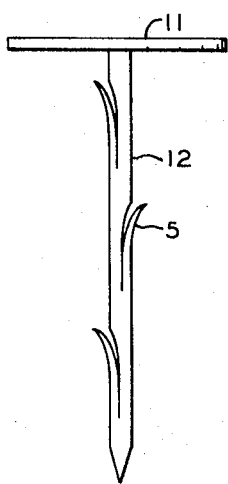
Figure 4:
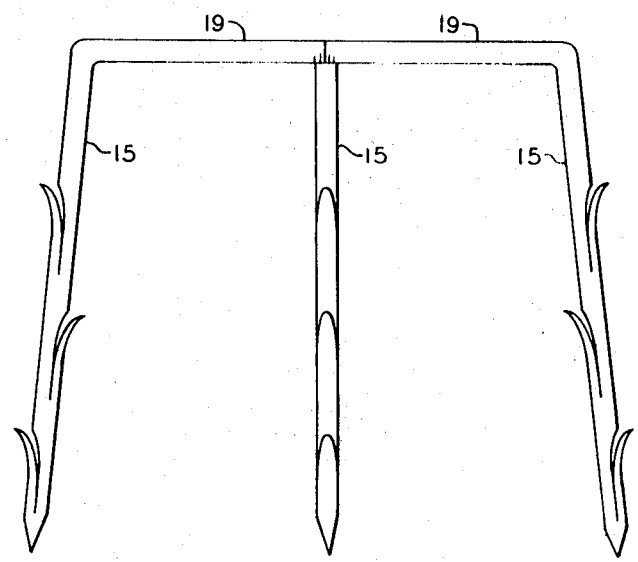

The apparatus of this invention will be more easily understood if explained in conjunction with the attached drawing in which FIG. 1 shows one embodiment of this invention; FIG. 2 shows an embodiment of the apparatus of FIG. 1; FIG. 3 shows another embodiment of this invention; and FIG. 4 shows still another embodiment of the invention.

Referring now to FIG. 1, there is shown staple fastener 1 having shank portions or legs 2 and 3 interconnected by bridge 4. Legs 2 and 3 are tapered at their extremities to facilitate penetration.

One or both of legs 2 and 3 have formed into their sides a plurality of notches, the notches being formed by penetrating the leg member in a downward direction to form an upwardly protruding barb 5. Dimensions of barb 5 are such as to proceed from the minimum at their uppermost extremity 6 to a maximum at their root portion 7 which is integral with the shank portion, the root area of the barb being preferably less than one-half the area of the leg from which the barb is formed. When formed of a suitably resilient material, the formation of the barb by the cutting action of the tool employed will be such that the barb assumes an angularly and outwardly projecting position from leg 2, that is, points 6 of the barb are caused to project some distance beyond the legs. When the staple is fabricated of a hereinafter-proposed material, the projection of points 6 beyond leg 2 takes place as a natural consequence of the wedging action of the tool employed to form the barb.

FIG. 2 illustrates a second embodiment of that staple indicated in FIG. 1. In this instance, however, horizontally disposed bridge 9 connects members 10 which are disposed in angular relationship to legs 2 and 3. Sections 10 do not lie in the vertical plane but progressively diverge in a downward direction. As a result, bridge 9 projects progressively downward from members 10 toward its center between legs 2 and 3. By the combination of the angular disposition of sections 10 and the downward projection of bridge 9 in combination with the diverging legs, the legs being flexed towards each other to penetrate the surface into which they are positioned, bridge 9 is caused to exert a downward force upon that area between the legs and on which bridge 9 rests. Since the action of bridge 9 is both to depress and simultaneously exert an upward or removal force on the staple, the barbs formed in the legs serve not only to retain the staple in position but, due to their retaining action, they facilitate the exertion by bridge 9 of a much greater downward force than would otherwise be possible.

FIG. 3 indicates still another embodiment of this invention in which the fastening member is composed of a single leg 12, adapted with a bearing surface 11, leg 12 being adapted with barbs 5. In this instance, a considerable variation in the downward bearing or retention capacity of the fastener can be effected by the area of bearing surface 11.

It will be appreciated that more than two legs can be employed in the apparatus of this invention. For example, as shown in FIG. 4, three legs 15 can be employed, these legs being interrelated by bridges 19 positioned in angular relation to each other. For example, if bridges 19 are positioned at right angles to each other, the apparatus of this embodiment is particularly adapted for retaining films and mats at their corners.

As mentioned, the apparatus of this invention is particularly suitable in those applications in which the eventual disintegration of the fastener is desired. For this reason, and for other reasons, the apparatus of this invention is particularly adapted to fabrication of oriented polymeric compounds such as polypropylene. This material and related materials are particularly suitable for use in such apparatus since they are sufficiently resilient as to form the projecting barbs upon the mere slitting of the leg surfaces as described. Equally as important, however, such material is known to deteriorate under exposure to ultraviolet light and hence will decompose after usage. The operating life of exposed portions of such members can be reasonably projected by selecting the various dimensions of the apparatus concerned. For example, oval filament members from about 10 to about 12 mils in diameter could be expected to have a retention life of about 4 to 6 weeks while members having a diameter of from about 16 mils to about 20 mils could be expected to have a life of about 12 to about 14 weeks.

It will be appreciated that the apparatus of this invention can be manufactured of any materials, with the various members being of any dimensions. While the number of barbs will depend primarily upon the length of the leg or legs of the fastener, any suitable number can be employed.

Other modifications of this invention will be evident in light of the above disclosure. Such, however, are considered as being within the scope of the invention.

What is claimed is:

1. A fastener for positioning into a material to be fastened comprising at least two resilient shank members in spaced relationship and connected by at least one bridge member, said shank members being adapted along their lengths with a plurality of barbs, said shank members converging inwardly along their lengths to said bridge member, said shank members being formed of polypropylene and of such selected dimensions so as to deteriorate in ultraviolet light within a preselected time period so as to destroy the fastening action of said fastener, said shank member being flexible towards each other for positioning and flexing from each other to resist removal after positioning.

2. The fastener of claim 1 in which said bridge comprises a pair of members angularly connected to said shank members and a third member interconnecting said pair of members, said third member projecting progressively downward towards its center from each of said pair of members, said third member being adapted to exert a downward force upon positioning of said fastener.

References Cited

UNITED STATES PATENTS

| | | | |
|---|---|---|---|
| 2,058,020 | 10/1936 | Jaffe | 85—13 |
| 2,510,693 | 6/1950 | Green | 85—P |
| 2,711,520 | 6/1955 | Kernen et al. | 85—21 |
| 2,857,735 | 10/1958 | Mashl | 85—49 |
| 2,927,497 | 3/1960 | Rapata | 85—21 |
| 3,183,762 | 5/1965 | Poupitch | 85—62 |
| 3,494,006 | 2/1970 | Brumlik | 85—21 |

FOREIGN PATENTS

| | | | |
|---|---|---|---|
| 20,126 | 9/1907 | Great Britain | 85—49 |
| 211,266 | 2/1924 | Great Britain | 85—49 |
| 916,048 | 1/1963 | Great Britain | 85—21 |
| 198,694 | 12/1938 | Switzerland | 85—21 |

MARION PARSONS, Jr., Primary Examiner

U.S. Cl. X.R.

85—13, 21; 264—22, 317